United States Patent [19]

Won

[11] Patent Number: 5,253,880
[45] Date of Patent: Oct. 19, 1993

[54] CLAMPING DEVICE FOR HOLDING A WORKPIECE IN A LATHE

[75] Inventor: Pyeong-Sig Won, Suwon, Rep. of Korea

[73] Assignee: Samsung Electronics Co., Ltd., Suweon, Rep. of Korea

[21] Appl. No.: 786,077

[22] Filed: Oct. 31, 1991

[30] Foreign Application Priority Data

Nov. 1, 1990 [KR] Rep. of Korea .................. 90-17697

[51] Int. Cl.$^5$ .............................................. B23B 31/18
[52] U.S. Cl. .................... 279/106; 279/133; 279/141
[58] Field of Search ............ 279/35, 106–109, 279/133, 137, 141

[56] References Cited

U.S. PATENT DOCUMENTS

| | | | |
|---|---|---|---|
| 1,947,957 | 2/1934 | Tillman | 279/106 |
| 1,959,081 | 5/1934 | Le Jeune | 279/133 X |
| 3,604,717 | 9/1971 | Hohwart | 279/137 |

*Primary Examiner*—Steven C. Bishop
*Attorney, Agent, or Firm*—Burns, Doane, Swecker & Mathis

[57] ABSTRACT

A clamping device for clamping a workpiece having a center hole, comprises a base member against which the workpiece can be seated, such that the center hole of the workpiece is aligned with a center aperture in the base member. The base member carries outer clamps for clamping an outer portion of the workpiece against the supporting surface. A push member projects through the hole and aperture and carries inner clamps for clamping an inner portion of the workpiece. An actuator displaces the push member for moving the inner clamps to their clamping position, whereupon the push member pushes the outer clamps to their clamping positions. A spring-biased ejector pushes the inner and outer clamps to their non-clamping positions, and ejects the workpiece when the actuator is moved to a release position.

14 Claims, 3 Drawing Sheets

CLAMPING DEVICE FOR HOLDING A WORKPIECE IN A LATHE

BACKGROUND OF THE INVENTION

1. Field of the Invention

This invention relates to a clamping device for holding a workpiece in a lathe, and more particularly to a clamping device which is capable of holding a disc-shaped thin workpiece having a circular hole at the center with a uniform clamping force to facilitate a machining operation and improve the productivity by shortening the time for mounting a workpiece in the lathe.

Generally, in case of machining an inner or an outer portion of a workpiece with a lathe, the workpiece is supported in a chuck or held between centers to permit various machining operations to be performed. When the workpiece is formed like a disc-shaped thin workpiece having a circular hole at the center, it is difficult to support the workpiece by means of the existing lathe chuck. Accordingly, a separate holder or a jig should be adopted to hold the disc-shaped thin workpiece in the lathe, which increases the mounting time of the workpiece in the lathe so that productivity may be remarkably lowered.

Since the workpiece is mounted in the chuck by means of manual operation by the worker, there must be a minute eccentricity in holding the workpiece, whereby a uniform clamping force can not be obtained so that the workpiece becomes vibrated during the machining operation. Therefore, the dimensional precision of the machined workpiece is deteriorated and there remains a clamping trace on the machined surface of the workpiece, which lowers the quality of the machined products.

SUMMARY OF THE INVENTION

Therefore, the present invention has been made in consideraion of the above mentioned problems. It is an object of the present invention to provide a clamping device for holding a workpiece in a lathe which is capable of holding an inner portion and an outer portion of a disc-shaped thin workpiece having a circular hole at the center with a uniform clamping force to shorten the mounting time of the workpiece in the lathe and improve the quality of the machined product.

To achieve the above object, the clamping device in accordance with the present invention comprises a base member having a threaded hole at the upper portion, a first receiving space for receiving outer clamping members at the middle portion, and a hollow shaft at the lower portion in which a upper surface of the base member supports a disc-shaped workpiece having a center hole and said hollow shaft is detachably held in a lathe chuck; a socket member having an opening for receiving a wrench means at its upper end and a nut portion threaded within the inside of its lower portion; inner clamping members for holding adjacent periphery of said center hole of the workpiece upon screwing said socket member counterclockwise; a push member having a first bolt portion threaded around the upper end to be assembled with said nut portion of said socket member, a second receiving space for receiving said inner clamping members below said bolt portion, and a second bolt portion threaded around the lower periphery thereof to be assembled with said threaded hole of said base member in which said push member moves up or down by rotation of said socket member; outer clamping members installed within said first receiving space of said base member for holding an outer periphery of said disc-shaped workpiece upon the downward movement of said push member; an eject member having a protrusion portion at the lower end for releasing said inner/outer clamping members from the workpiece upon releasing motion of said socket member; and a resilient member installed within the hollow shaft of said base member for supporting said eject member by its resilient force.

According to the clamping device of this invention, the disc-shaped thin workpiece having the center hole is mounted on the upper surface of the base member in which the socket member and the inner clamping members are protruded through the center hole of the workpiece. By screwing the socket member with the wrench means clockwise, the nut portion of the socket member is apt to be engaged with the first bolt portion of the push member and moved downward together so that the inner clamping members may be pivotably stretched to press down the adjacent periphery of the center hole of the workpiece.

Further screwing the socket member clockwise, the second bolt portion of the push member is engaged with the threaded hole of the base member and moved downward. Accordingly, the lower end of the push member depresses the one end of the outer clamping members, whereby the outer clamping members may pivotably clamp the outer periphery of the workpiece with a uniform force.

Meantime, after machining operation of the workpiece is finished, the socket member is screwed counterclockwise with the wrench means until the inner/outer clamping members may be returned to its initial position upon sequential reverse movements of the eject member and the push member, in turns. Here, the resilient member exerts it resilient force on the lower end of the protrusion portion of the eject member to move up the eject member, whereby the inner/outer clamping members release the clamping force for holding the machined workpiece so as to pick it up from the upper surface of the base member.

These and other objects and features of the invention will be more fully appreciated from the following detailed description when taken in conjunction with the accompanying drawings in which:

DETAILED DESCRIPTION OF THE PREFERRED EMBODIMENT

Figure 1:
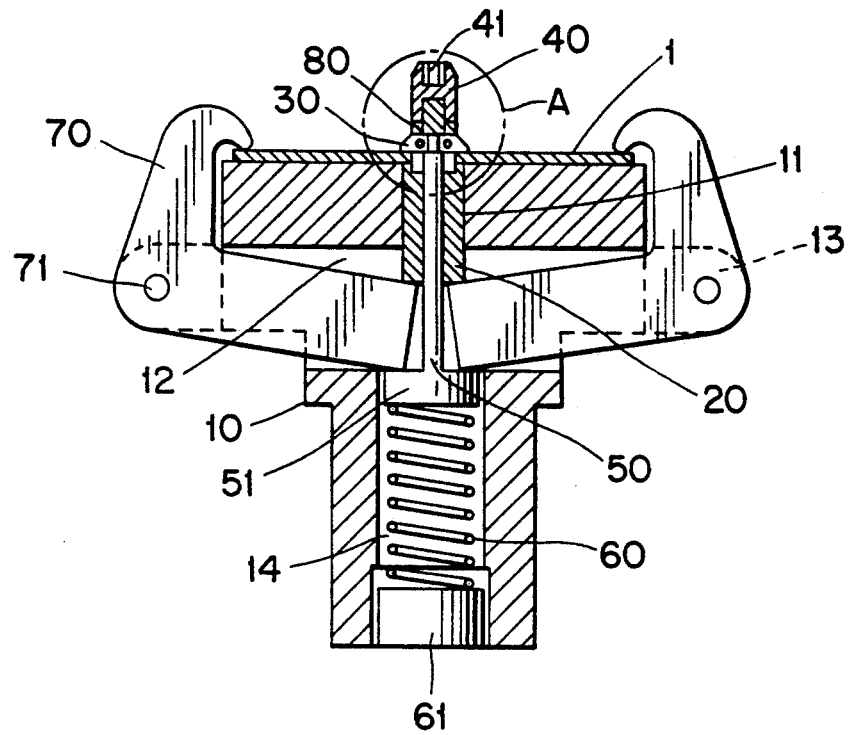
FIG. 1 is a sectional view illustrating the clamping device holding the workpiece in accordance with the present invention.
Figure 2:
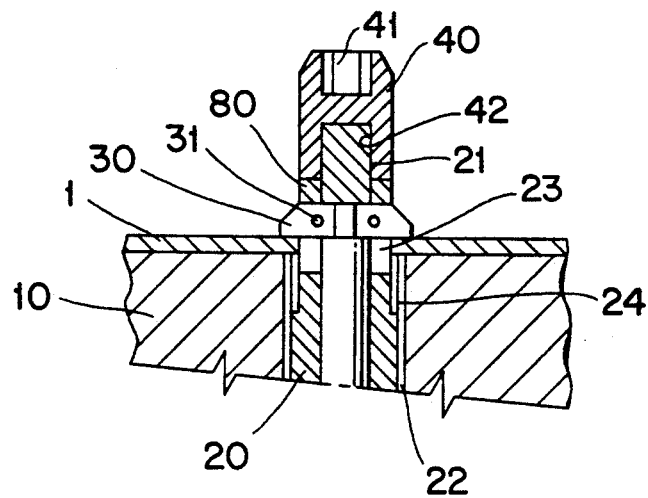
FIG. 2 is an enlarged sectional view illustrating the circled "A" portion in FIG. 1.

Now, a preferred embodiment of the clamping device will be described with reference to the accompanying drawings.

Referring FIG. 1 to FIG. 5, reference numeral 10 denotes a base member shaped like a cylinder in which a upper portion and a lower portion are formed of different diameters. An upper supporting surface of the base member 10 supports a disc-shaped thin workpiece 1 having a hole at its center and a lower portion of the base member 10 is formed like a hollow shaft which is held in a lathe chuck (not shown). The base member 10 is provided with a threaded hole or aperture 11 at its upper portion and a first receiving portion 14 at its lower portion.

Meantime, the base member 10 is formed with a first receiving space 12 which extends horizontally at the middle portion thereof and receives outer clamping members 70 therein. A plurality of support portions 13 having a respective throughhole are integrally formed at the outer periphery of the base member 10 so that the outer clamping members 70 are pivotably assembled by a respective connecting pin 71.

Figure 3:
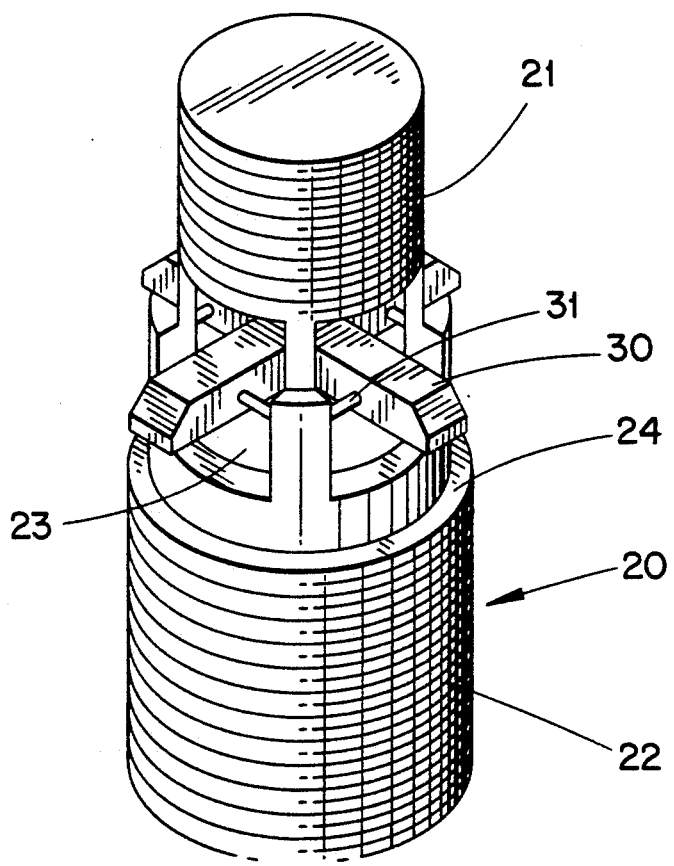
FIG. 3 is an enlarged perspective view illustrating the assembly of the push member and the inner clamping members in accordance with the present invention.
Figure 4:
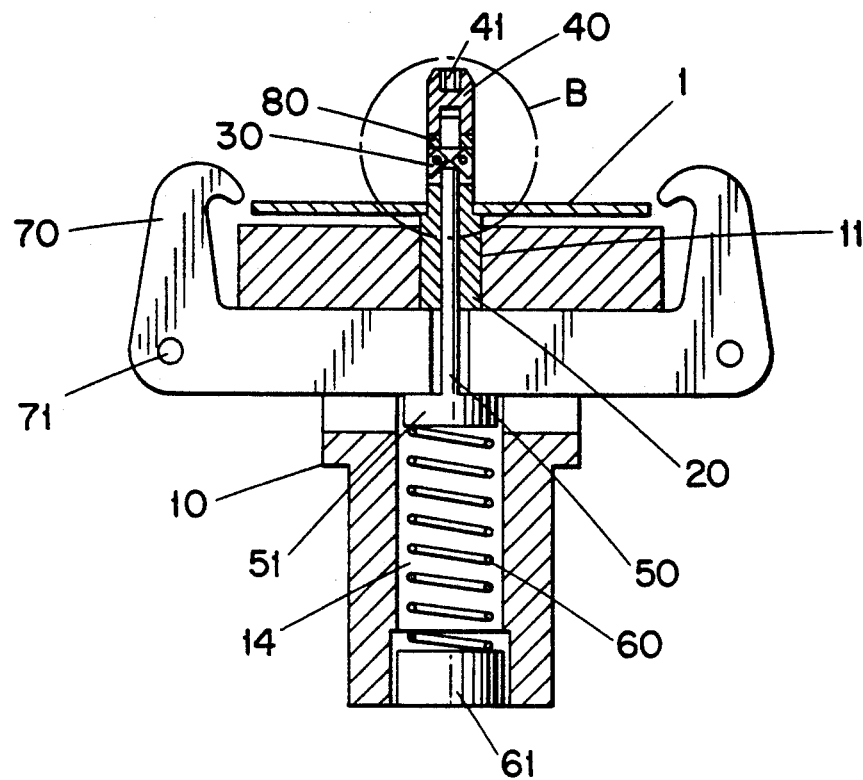
FIG. 4 is a sectional view illustrating the clamping device releasing the workpiece in accordance with the present invention.

A push member 20 having a first bolt portion 21 and a second bolt portion 22 around its periphery is engaged with the threaded hole 11 of the base member 10. The push member 20 is provided with a second receiving space 23 below the first bolt portion 21 for receiving a plurality of inner clamping members 30 which hold an adjacent periphery of the center hole of the workpiece. Each inner clamping member 30 is assembled to the push member 20 through a pin 31 as shown in FIG. 3. The second receiving space 23 of the push member 20 is subjected to receive the respective inner clamping members 30 therein to permit the machined workpiece to be easily picked up after releasing operation of the inner clamping member 30.

Figure 5:
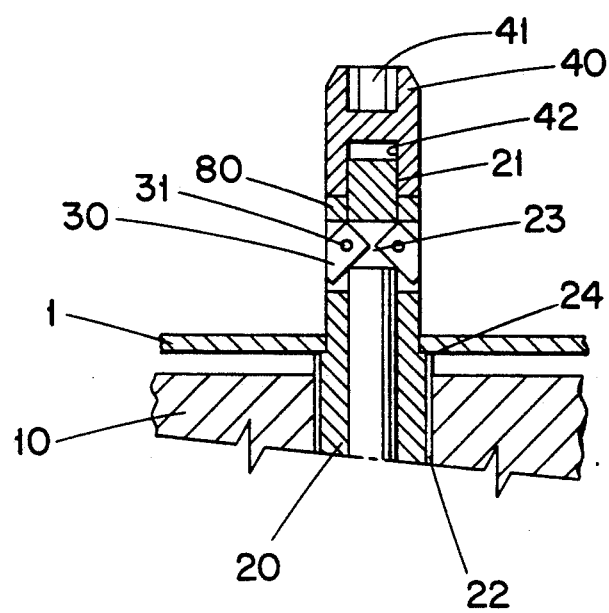
FIG. 5 is an enlarged sectional view illustrating the circled "B" portion in FIG. 4.

A stepped portion 24 is formed at the upper end of the push member 20 in order to lift the workpiece 1 from the upper surface of the base member 10 when the push member 20 moves upward as shown in FIG. 5.

An actuator socket member 40 is assembled with the push member 20. The socket member 40 is formed with an opening 41 shaped as a hexagon or a square for receiving a wrench means (not shown) at its upper end and an internally threaded nut portion 42 at its lower end joining with the first bolt portion 21 of the push member 20.

A washer member 80 is inserted around the first bolt portion 21 of the push member 20 and assists the pivot operation of the inner clamping members 30 for holding or releasing the workpiece 1 with the help of the resilient force of a resilient member 60 described hereinafter.

The lower end of the push member 20 comes into contact with the plurality of outer clamping members 70. The outer clamping members 70 are pivotably assembled to the respective support portion 13 of the base member 20 through a respective connecting pin 71 within the first receiving space 12, whereby the outer clamping members 70 are pivoted around the connecting pins 71 for holding or releasing the outer periphery of the workpiece 1, respectively Furtheremore, reference numeral 50 indicates an eject member in T-shaped form having a protrusion portion 51 at its lower end. The upper surface of the protrusion portion 51 contacts with each lower edge of the outer clamping members 70. The remaining portion of the eject member 50 passes through an inside of the push member 20 and contacts with each lower edge of the inner clamping members 30.

The resilient member 60 is inserted within the receiving portion 14 of the base member 20 in which the restoring force of the resilient member 60 pushes the eject member 50 upward to release the inner/outer clamping members 30 and 7 upon the loosening operation of the socket member 40.

A stopper 61 is secured to the bottom of the receiving portion 14 of the base member 20 for preventing the resilient member 60 from being deviated therefrom.

The operation of the clamping device in accordance with the present invention constructed as above will be described hereinafter.

When the disc-shaped thin workpiece 1 needing facing work on its surface is to be held in the lathe, the workpiece 1 having a center hole is supported within a lathe chuck (not shown) by means of the clamping device of this invention as follows.

The workpiece 1 is mounted on the upper surface of the base member 10 in which the socket member 40 passes through the center hole of the workpiece 1 and protrudes therefrom, with the clamping members 30 oriented vertically.

Now, inserting the wrench means(not shown) within the opening 41 of the socket member 40 and screwing it clockwise, the socket member 40 revolves and moves downward so that the socket member 40 along with the washer member 80 become move downwardly along the first bolt portion 21 of the push member 20. When the washer member 80 descends and depresses the upper edges of the inner clamping members 30, the inner clamping members 30 are pivoted around the pin 31 and stretched out horizontally, i.e., parallel to the workpiece 1.

At this point, upon further screwing of the socket member 40 clockwise, the push member 20 is revolved by the friction force from the washer member 80 and moves downward within the threaded hole 11 of the base member. Upon the downward movement of the push member 20 within the threaded hole 11, the lower end of the push member 20 contacts with the respective edges of the outer clamping memeber 70 and presses them down.

Accordingly, the outer clamping members 70 are pivoted around each connecting pin 71 to hold the outer periphery of the workpiece 1 with uniform force, and simultaneously the strectched inner clamping members 30 also hold the adjacent periphery of the center hole of the workpiece 1. During the above mentioned clamping operation, the resilient member 60 is compressed between the protrusion portion 51 of the eject member 50 and the stopper 61 within the receiving portion 14 of the base member 10.

After the machining operation on the workpiece 1 is finished, the workpiece 1 tightly held by means of the inner/outer clamping members 30 and 70 is released as follows. That is, inserting the wrench means (not shown) within the opening 41 of the socket member 40 and screwing is counterclockwise, the socket member 40 along with the push member 20 revolve in counterclockwise and move upward to a release position. Here, the resilient member 60 in compression state exerts its restoring force on the lower end of the eject member 50 to move the eject member 50 upward.

Therefore, the upper surface of the protrusion portion 51 of the eject member 50 pushes the lower respective edges of the outer clamping members 70 and, simultaneously, the upper end of the eject member 50 pushes the lower respective edges of the inner clamping members 30, whereby the holding forces of the inner/outer clamping members 30 and 70 may be removed from the workpiece 1.

In addition, the stepped portion 24 of the push member 20 lifts the workpiece 1 from the upper surface of the base member 10, and then the machined workpiece 1 can be picked up and discharged from the clamping device of this invention.

As described above, according to the clamping device of the present invention, it is noted that the workpiece can be held with uniform clamping force or released with ease by screwing the socket member, thereby shortening the mounting time of the workpiece in the lathe so as to increase the productivity. Further, the quality of the product can be improved by machining the workpiece held with uniform clamping force.

The foregoing disclosure and description of the invention is illustrative and explanatory thereof, and various changes and modifications may be made within the scope of the appended claims without departing from the spirit of the invention.

What is claimed is:

1. A clamping device for holding a disc-shaped workpiece having a center hole, comprising:
    a supporting surface on which the workpiece can be seated such that the center hole thereof is aligned with a center aperture in said supporting surface,
    outer clamping means movable between a non-clamping position and a clamping position wherein a portion of said clamping means clamps an outer peripheral portion of the workpiece against said supporting surface,
    an inner assembly extending through said center aperture and the center hole, said inner assembly including:
        inner clamping means movable between a non-clamping position and a clamping position, a portion of said inner clamping means clamping an inner portion of the workpiece against said supporting surface when said inner clamping means is in said clamping position,
        moving means for moving said inner and outer clamping mens to their clamping positions, said moving means being movable to a release position permitting said inner and outer clamping means to be moved to their non-clamping positions,
        an ejector member movable within said center aperture to an ejecting position for moving said inner and outer clamping means to their non-clamping positions, and
        biasing means arranged to store energy in response to movement of said inner and outer clamping means to their clamping positions and to bias said ejector member to its ejecting position in response to movement of said moving means to said release position.

2. A clamping device according to claim 1, wherein said ejector member is arranged to eject the workpiece from said supporting surface while moving said inner and outer clamping means to their non-clamping positions.

3. A clamping device according to claim 1, wherein said supporting surface comprises a portion of a base member, said center aperture extending through a portion of said base member, said outer clamping means being mounted to said base member, said inner assembly comprising a push member extending through said center aperture of said supporting surface and the center hole of the workpiece, said inner clamping means being mounted on said push member, said moving means comprising actuator means for moving said inner clamping means relative to said push member to its clamping position, and moving said push member relative to said base member against said outer clamping means to move said outer clamping means to its clamping position.

4. A clamping device according to claim 1, wherein movement of said moving means to said release position permits said inner and outer clamping means to be moved to their non-clamping positions by a biasing force from said biasing means.

5. A clamping device for holding a workpiece in a lathe, comprising:
    a base member having a threaded hole at an upper portion thereof, a first receiving space for receiving outer clamping members at a middle portion thereof, and a hollow shaft at a lower portion thereof in which an upper surface of said base member supports a disc-shaped workpiece having a center hole, and said hollow shaft is detachably held in a lathe chuck;
    a socket member having an opening for receiving a wrench means at its upper end and an internally threaded nut portion at its lower end;
    inner clamping members for holding a portion of the workpiece disposed adjacent said center hole of the workpiece upon screwing said socket member in one direction and releasing the workpiece upon rotating said socket member in an opposite direction;
    a push member having a first bolt portion externally threaded at its upper end to be assembled with said nut portion of sid socket member, a second receiving space for receiving said inner clamping members below said bolt portion, and a second bolt portion externally threaded at its lower periphery to be assembled with said threaded hole of said base member so that said push member moves up or down in response to rotation of said socket member;
    outer clamping members installed within said first receiving space of said base member for holding an outer periphery of said disc-shaped workpiece in response to the downward movement of said push member;
    an eject member having a protrusion portion at its lower end for moving said inner clamping member from the workpiece upon loosening motion of said socket member; and
    a resilient member installed within the hollow shaft of said base member for supporting said eject member by its resilient force.

6. A clamping device according to claim 5, wherein said inner clamping members are supported within said second receiving space in spaced apart relationship by respective pins.

7. A clamping device according to claim 5, wherein said outer clamping members are pivotably assembled at support portions in spaced apart relationship within said first receiving space by connecting pins for holding the outer periphery of the workpiece with uniform clamping forces.

8. A clamping device according to claim 5, wherein a washer member is inserted around said first bolt portion of said push member and is arranged to push said inner clamping members against the workpiece.

9. A clamping device according to claim 5, wherein said push member is provided with a stepped portion for lifting the workpiece from the upper surface of said base member when said inner and outer clamping members are released.

10. A clamping device according to claim 5, wherein a stopper is secured to the bottom of the receiving portion of said base member for retaining said resilient member.

11. A clamping device for holding a disc-shaped workpiece having a center hole, comprising:
a supporting surface on which the workpiece can be seated such that the center hole thereof is aligned with a center aperture in said supporting surface,
outer clamping means movable between a non-clamping position and a clamping position wherein a portion of said clamping means clamps an outer peripheral portion of the workpiece against said supporting surface,
an inner assembly extending through said center aperture and the center hole, said inner assembly including:
inner clamping means movable between a non-clamping position and a clamping position, a portion of said inner clamping means clamping an inner portion of the workpiece against said supporting surface when said inner clamping means is in said clamping position, and
moving means for moving said inner and outer clamping mens to their clamping positions,
said supporting surface comprising a portion of a base member, said center aperture extending through a portion of said base member, said outer clamping means being mounted to said base member, said inner assembly comprising a push member extending through said center aperture of said supporting surface and the center hole of the workpiece, said inner clamping means being mounted on said push member, said moving means comprising actuator means for moving said inner clamping means relative to said push member to its clamping position, and moving said push member relative to said base member against said outer clamping means to move said outer clamping means to its clamping position.

12. A clamping device according to claim 11, wherein said push member is threadedly mounted in said center aperture such that rotation of said push member about a longitudinal axis produces said relative movement of said push member relative to said base member, said actuator means comprising a rotatable socket member connected to said push member for transmitting rotation forces thereto.

13. A clamping device according to claim 12, wherein said socket member is movable to a release position permitting said inner and outer clamping means to be moved to their non-clamping positions, an ejector member movable within said center aperture to an ejecting position for moving said inner and outer clamping means to their non-clamping positions, and biasing means arranged to store energy in response to movement of said inner and outer clamping means to their clamping positions and to bias said ejector member to its ejecting position in response to movement of said socket member to its release position.

14. A clamping device according to claim 13, wherein said ejector member is arranged to eject the workpiece from said supporting surface while moving said inner and outer clamping means to their non-clamping positions.

* * * * *